(No Model.)

J. A. BILZ.
TWO WHEELED VEHICLE.

No. 494,752. Patented Apr. 4, 1893.

Witnesses,
Inventor,
John A. Bilz
By Dewey & Co.
Attys

UNITED STATES PATENT OFFICE.

JOHN A. BILZ, OF PLEASANTON, CALIFORNIA.

TWO-WHEELED VEHICLE.

SPECIFICATION forming part of Letters Patent No. 494,752, dated April 4, 1893.

Application filed October 26, 1892. Serial No. 450,076. (No model.)

*To all whom it may concern:*

Be it known that I, JOHN A. BILZ, a citizen of the United States, residing at Pleasanton, Alameda county, State of California, have invented an Improvement in Two-Wheeled Vehicles; and I hereby declare the following to be a full, clear, and exact description of the same.

My invention relates to the general class of two wheeled vehicles and especially to the sub-class of sulkies.

It consists in the novel arrangement, construction and combination of the several parts of the vehicle, which I shall hereinafter fully describe and specifically point out in the claims.

My invention, though applicable to any two wheeled vehicle, is especially intended for those having small wheels of any character, and particularly wheels having rubber tires, and such tires as are inflated and known as pneumatic tires, which have given to racing vehicles the now generally accepted term of "pneumatic sulkies." In this class of vehicles, on account of the small wheels, it is essential to obtain sufficient elevation of frame and seat, and in effecting this, regard must be had to such a connection of axle, shafts and wheels as will give ample room for the movements of the horse, and will yield rigidity and strength consistent with lightness.

To obtain these results is the object of my invention.

Figure 1:
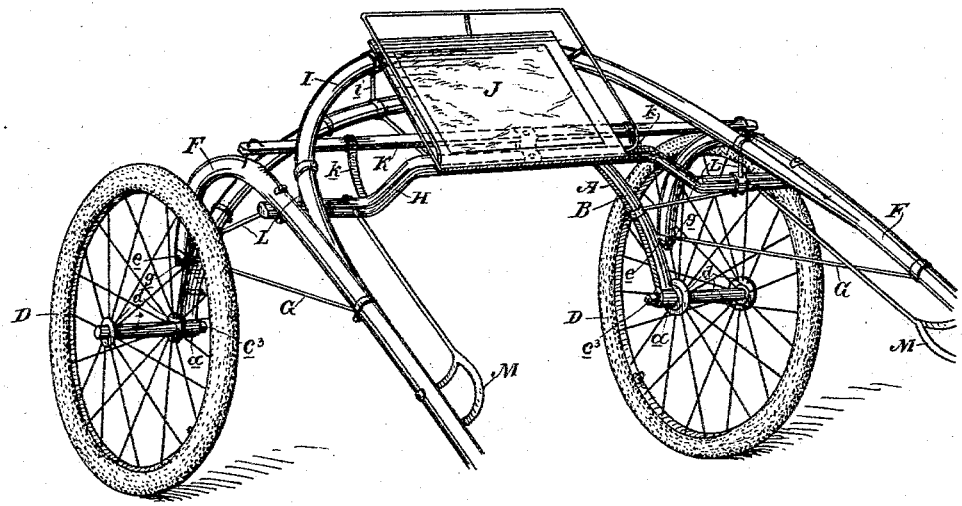
Figure 2:
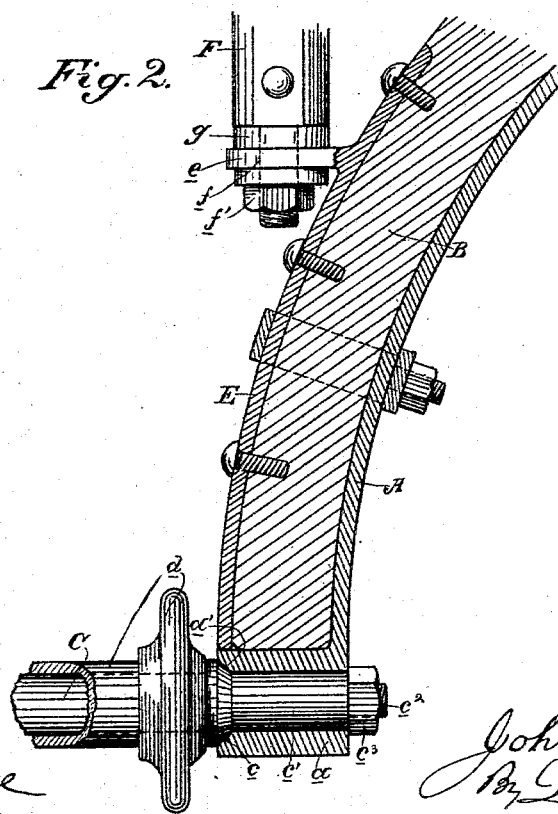

Referring to the accompanying drawings for a more complete explanation of my invention,—Figure 1 is a perspective view of my vehicle. Fig. 2 is a view showing the connection of the axle with the wheel spindles and the connection of the shafts with the axle.

A is an arched or bowed axle with a wooden sheathing B, suitably clipped thereto. Each extremity of the axle is formed or provided with a horizontal outwardly extending bearing $a$, upon top of which the ends of the sheathing B impinge.

C are the wheel spindles, upon which are mounted in suitable manner (usually by ball bearings unnecessary herein to show) the hubs $d$ of the small wheels D, which are here shown of the pneumatic tire type. The spindle C has at its inner end a bevel faced flange $c$ and a stem $c'$ terminating in a screw-threaded end $c^2$. The stem $c'$ of the spindle passes through the horizontal bearing $a$ of the axle, and takes a nut $c^3$ on its inner end, while its beveled flange $c$ fits snugly in a correspondingly beveled recess $a'$ in the outer end of bearing $a$. Thus the spindles C are rigidly and firmly secured to the axle; and by removing nut $c^3$, they and the wheels can readily be removed when necessary.

Upon the outer surface of the downwardly curved ends of the axle or, as here shown, upon the sheath B thereof, are clipped the steadying plates E, the lower ends of which impinge upon the upper surfaces of the projecting ends of the bearings $a$. From each of these plates projects horizontally a lug $e$ which lies above the spindle connection with the axle. Upon these lugs rest the extremities of the downwardly bent ends of the shafts F, and said ends are secured by the strap bolts $f$ passing through said lugs and taking nuts $f'$ beneath. The rear ends $g$ of braces G lie between the shaft extremities and lugs $e$, and the forward ends of said braces are suitably secured to the shafts at points forward, as shown.

H is the cross bar of the shafts suitably secured thereto and having an upwardly rising or bowed center.

I is a horizontally curved back bar secured at its ends to the shafts, and supported at its back by suitable braces $i$ rising from the axle.

J is the seat, supported upon and between bars H and I.

K is the whiffletree supported centrally from bar H, and suitably connected therewith by safety limiting straps $k$.

L are braces between the axle and shafts, and M are the foot rests.

By reason of the arched or bowed shape of the axle and the downwardly curved ends of the shafts, the seat of the sulky is elevated sufficiently, notwithstanding that the axle ends lie in the horizontal plane of the wheel centers.

In sulkies of this class it is usual to gain elevation of seat, by supporting the axle ends above the wheel tops by means of standards rising on each side of the wheels from their spindles. This necessitates braces passing from each end of the wheel spindles upwardly and forwardly to the shafts. These braces are objectionable in several particulars, principally in tending to converge the imperfectly connected wheels, by the leverage of the shafts in drawing in to the sides of the horse, and also in being in the way of the horse, diminishing what is termed the "hock room." In my construction, the connection of the axle is in the line of and directly with the wheel spindles, and the objectionable side braces from the ends of the spindles are dispensed with, thus avoiding converging leverage on the wheels and at the same time furnishing ample "hock room." The particular connection here shown, between the axle and wheel spindles, is rigid and strong. The stems c' of the spindles are well supported in the axle bearings a, and said bearings are themselves fully supported and stiffened, both by the bearing of the sheath B thereon, and by the weight of the rider acting through the steadying plates E, directly over and down upon the outer ends of said bearings a. There will not, therefore, be any tendency of said bearings to tilt or rock, and the wheel spindles will be held steady and true. The stems c' of the spindles are also well held and braced in the bearings and strengthened by their beveled flange fitting the beveled recess of the bearings. The connection of the downwardly bent ends of the shafts with the arched axle near its extremities, and in the manner shown, prevents, by the weight of the rider, any tendency of the axle, to spread or straighten. Thus all the parts are well and conveniently arranged to give ample room to the horse, and are connected in a manner to obtain great strength and rigidity consistent with lightness.

Having thus described my invention, what I claim as new, and desire to secure by Letters Patent, is—

1. In a two-wheeled vehicle, the combination of an arched or bowed axle having bearings at its extremities, horizontal wheel spindles fitted at their inner ends to said bearings, steadying plates on the outer surfaces of the axle near its ends and impinging on the tops of the bearings, lugs on said plates above the spindles and shafts having downwardly bent rear ends resting upon and secured to said lugs, substantially as herein described.

2. In a two-wheeled vehicle, the combination of an arched or bowed axle having outwardly projecting bearings at its extremities, and a wooden sheath the ends of which impinge on said bearings, horizontal wheel spindles fitted to said bearings, steadying plates on the outer surfaces of the axle near its ends and impinging on the tops of the outer ends of the bearings, said plates having projecting lugs above the spindles, and shafts with downwardly bent rear ends resting upon and secured to said lugs, substantially as herein described.

3. In a two-wheeled vehicle, the combination of an arched or bowed axle having outwardly projecting bearings at its extremities, and a wooden sheath the ends of which impinge on said bearings, horizontal wheel spindles fitted to said bearings, steadying plates on the outer surfaces of the axle near its ends and impinging on the tops of the outer ends of the bearings, said plates having projecting lugs above the spindles, shafts with downwardly bent rear ends resting upon and secured to said lugs, and braces secured to said lugs and to the shafts at points forward, substantially as herein described.

4. In a two-wheeled vehicle, the combination of the arched or bowed axle, the shafts with downwardly bent rear ends secured to said axle near its extremities, the cross bar secured between the shafts and having a raised center, the backwardly curved horizontal back bar secured to the shafts and supported above the axle and the seat supported upon and between the cross bar and back bar, substantially as herein described.

In witness whereof I have hereunto set my hand.

JOHN A. BILZ.

Witnesses:
S. H. NOURSE,
J. A. BAYLESS.